July 7, 1942.   R. WASSERMANN   2,288,869

PROCESS FOR WELDING CASTIRON, PARTICULARLY AT LOW TEMPERATURE

Filed Nov. 16, 1940

INVENTOR.
RENE WASSERMANN.
BY Leon M. Straus

Patented July 7, 1942

2,288,869

UNITED STATES PATENT OFFICE 2,288,869

PROCESS FOR WELDING CAST IRON, PARTICULARLY AT LOW TEMPERATURE

Rene Wassermann, New York, N. Y.

Application November 16, 1940, Serial No. 366,021

7 Claims. (Cl. 117—50)

This invention concerns a new process of welding cast-iron particularly at low temperature.

Many attempts have been made heretofore to improve structure and quality of the weld metal.

Oxy-acetylene welding processes require generally a temperature of about 2300° F.–2600° F. The cast-iron to be treated is heated until a complete fusion on a broad surface thereof occurs, then a filler rod made of cast-iron is rubbed into the thus produced molten cast-iron bath. The use of a flux will prevent a too great oxidation, will make the molten metal bath more fluidous and will thus facilitate the welding process.

Heretofore, in order to obtain a joint at lower temperatures soldering and brazing operations were performed with a cuprous rod.

The present invention pursues a quite different path for accomplishing a cast-iron welding process at a relatively low temperature.

It is an object of the present invention to provide a process by which the base metal upon which the welding operation is to be performed will be subjected first to a predetermined preheating stage before the welding material is deposited thereon for joining or binding purposes, said preheating stage avoiding melting of said base metal.

It is another object of the present invention to produce the said preheating stage by the application of a substantially flatly directed oxy-acetylenic flame and utilizing the force of such formed and directed flame to "throw" the molten welding metal onto the base metal parts to be welded together.

Still another object of the present invention is to provide a process in which welding or brazing may be performed at low temperatures and in which the weld is substantially similar in color and properties to that of the base material welded.

These and other objects of the invention are realized from the following description which discloses one example incorporating the invention.

In carrying out the invention it has been found that cast-iron surface when previously cleaned, filed or ground, and then preheated to a temperature of about 800° to 1400° F. (dark red color) will absorb and make a perfect bond with molten cast-iron material.

Figure 2:
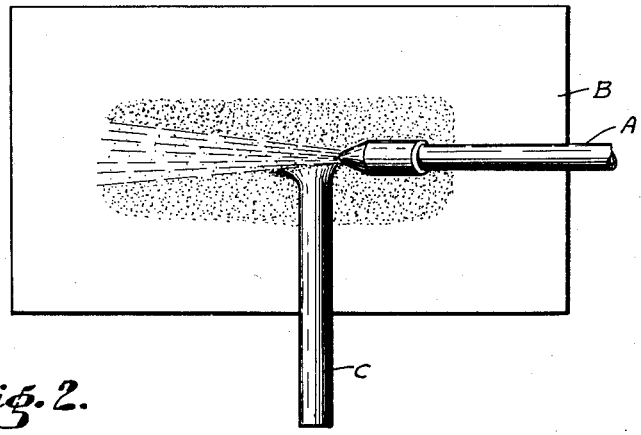
Figure 1:
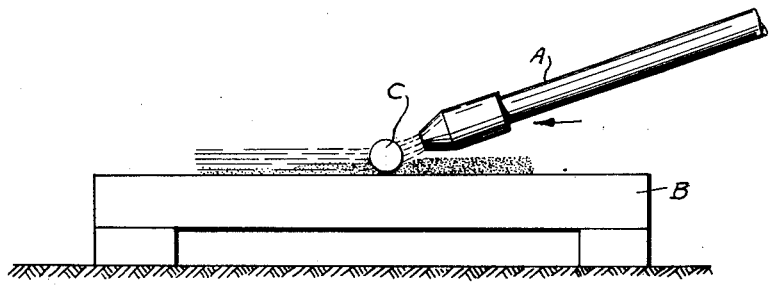

The process itself may be performed as follows:

The surface of the base metal to be welded is preheated with preferably an oxy-acetylenic torch to approximately 800° to 900° F., and may be covered with a flux or paste containing borax, the flame of the torch being applied substantially or approximately horizontally to the surface to be welded. A rod of cast-iron is arranged in front of the flame and by a preferably zigzag movement of the torch the molten metal from the said rod is made to flow onto the surface of the preheated base metal and thus caused to bind therewith. Breaks, cracks, defects, worn parts can by this method be welded perfectly at a low temperature. All the dangers of fusion welding by overheating are avoided, since the base metal is never melted. The torch A may form an angle of about 15° to 30° with respect to the base metal surface B and the cast-iron rod C may form an angle of about 90° with respect to the torch axis. When the rod material is melted down, it will be then pushed forward by the substantially flat flame D onto the preheated base surface B, as diagrammatically shown in Figs. 1 and 2 of the drawing, which are front elevational and top plan views, respectively.

Physically the weld forms an alloy of the molten cast-iron filler material on the heated surface while the flame pushes the molten metal of the rod onto the said preheated surface. The filler material penetrates the pores of the metal by capillary action. Both filler rod and base metal are thus completely and homogeneously combined without interposition of any oxide.

The above process may be improved by using instead of a plain cast-iron rod, a rod containing other ingredients, such as nickel, copper and molybdenum whereby the strength is improved; fluidity and melting point of the rod may be improved by the addition of phosphorus, sulphur, silicon, titane; and further manganese and aluminum.

Instead of using a composition containing borax better results may be obtained by using a paste or flux having a reduction and decarbonizing action by the addition of boric acid, potassium chloride, potassium nitrate, sodium perborate, sodium chloride, ferrum pulvis, fluorides.

It has been found that the use of a decarbonizing flux increased the speed of diffusion of the molten metal of the cast-iron rods and facilitates the application of the process.

It has also been found that the above process may be carried out by using a rod of cast-iron coated with a flux, thus producing a higher fluidity and producing a better bond. No flux or paste may then be applied to the surface of the material to be welded.

Having thus described the invention what is claimed as new and desired to be secured by Letters Patent, is:

1. A process for welding base material of cast-iron at low temperature which consists in first cleaning the base material to be welded, preheating said base material to a temperature of about 800° to 1400° F. by applying to its surface a substantially flat horizontal oxy-acetylenic flame, melting a welding rod arranged in front of the flame and substantially composed of cast-iron including flux acting substance, and moving said flame in the direction of the flame and forwardly thereof thus causing the molten cast-iron from said rod to flow onto said preheated surface thereby forming a homogeneous bond with the latter.

2. A process for welding base material of cast-iron at low temperature which consists in first cleaning the base material to be welded, covering the surface of said material with decarbonizing flux, preheating said base material to a temperature of about 800° to 1400° F. by applying to its surface a substantially flat horizontal oxy-acetylenic flame, melting a welding rod arranged in front of the flame and substantially composed of cast-iron, and causing the molten cast-iron from said rod to flow onto said preheated surface thereby forming a homogeneous bond with the latter.

3. A process for welding cast-iron base material at low temperature which consists in first cleaning the base material to be welded, preheating the same to a temperature at which said material becomes dark red by applying to the surface of said base material a substantially flat horizontal oxy-acetylenic flame, moving said flame in forward direction and in zig-zag formation over said surface, and melting a welding rod arranged in front of the flame and composed of substantially cast-iron provided with flux substance, thereby causing the molten cast-iron of said rod to flow onto said preheated surface forming a homogeneous bond with the latter.

4. A process for welding cast-iron base material at low temperature which consists in first cleaning the base material to be welded, preheating the same to a predetermined temperature of about 800° to 1400° F. by applying to the surface of said base material a substantially flat horizontal oxy-acetylenic flame, moving said flame forwardly and in zig-zag formation over said surface, and melting a flux containing welding rod arranged in front of the flame and substantially composed of cast-iron, thereby causing the molten cast-iron from said rod to flow onto said preheated surface forming a homogeneous bond with the latter.

5. A process for welding cast-iron material which consists in cleaning the surface of said material to be welded, preheating said surface to a temperature at which said material becomes dark red by applying to its surface a substantially horizontal oxy-acetylenic flame, melting a welding rod arranged in front of the flame and composed of substantially cast-iron and flux-acting ingredient, and moving said flame in forward direction, thereby causing the molten cast-iron of said rod to flow onto said preheated surface, whereby a homogeneous bond is formed with the latter.

6. A process for welding cast-iron material at low temperature which consists in cleaning the surface of said material to be welded, covering the surface of said material with flux, preheating said material to a temperature at which said surface becomes dark red by applying to the surface a substantially horizontal oxy-acetylenic flame, melting a welding rod arranged in front of the flame and substantially composed of cast-iron, and moving said flame forwardly and in the direction of the flame, thus causing the thereby molten cast-iron from said rod to flow onto said preheated surface, whereby a homogeneous bond is formed with the latter.

7. A process for welding cast-iron material which consists in cleaning the surface of said material to be welded, preheating said surface to a temperature at which said material becomes dark red by applying to its surface a substantially horizontal oxy-acetylenic flame, melting in front of the flame an alloyed cast-iron welding rod provided with flux substance, and moving said flame in forward direction, thereby causing the molten cast-iron to flow onto said preheated surface, whereby a homogeneous bond is formed with the latter.

RENE WASSERMANN.